United States Patent
Yang et al.

(10) Patent No.: US 7,978,634 B2
(45) Date of Patent: Jul. 12, 2011

(54) TDD SYSTEM BASED CELL HANDOFF METHOD AND USER EQUIPMENT

(75) Inventors: Guiliang Yang, Shanghai (CN);
Yuanxin Qiao, Shanghai (CN); Feng Li, Shanghai (CN); Na Wu, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 263 days.

(21) Appl. No.: 11/916,502

(22) PCT Filed: Apr. 20, 2006

(86) PCT No.: PCT/CN2006/000734
§ 371 (c)(1), (2), (4) Date: Jun. 3, 2008

(87) PCT Pub. No.: WO2006/131042
PCT Pub. Date: Dec. 14, 2006

(65) Prior Publication Data
US 2009/0122730 A1 May 14, 2009

(30) Foreign Application Priority Data
Jun. 6, 2005 (CN) .......................... 2005 1 0074996

(51) Int. Cl.
*H04J 3/00* (2006.01)
(52) U.S. Cl. .................... 370/280; 370/281; 370/331

(58) Field of Classification Search .......... 370/200–253, 370/312, 280–281, 331–335, 491–497, 74, 370/98, 500–545, 395.41; 455/442
See application file for complete search history.

(56) References Cited

U.S. PATENT DOCUMENTS

| 5,901,226 A * | 5/1999 | Brenner et al. ............... 455/437 |
| 2006/0039329 A1 * | 2/2006 | Samuel et al. ............... 370/335 |
| 2006/0105773 A1 * | 5/2006 | Lin et al. ..................... 455/452.1 |
| 2008/0076432 A1 * | 3/2008 | Senarath et al. ............. 455/442 |
| 2009/0225693 A1 * | 9/2009 | Yi et al. ....................... 370/312 |

FOREIGN PATENT DOCUMENTS
CN 1365579 8/2002
* cited by examiner

*Primary Examiner* — Ricky Ngo
*Assistant Examiner* — Iqbal Zaidi
(74) *Attorney, Agent, or Firm* — Merchant & Gould P.C.

(57) ABSTRACT

The present invention discloses a cell handoff method and a UE based on a TDD system. A UE measures received pilot channels of a source cell and a neighboring cell according to a measurement control message and reports measurement result to a RNC. The RNC, determines whether a target cell to be subject to a cell handoff process has available resources at a time slot different from that of the source cell and if yes, transmits a cell handoff command to the UE, allocates available resources for the UE in the target cell and transmits traffic carrier data of the UE to the source cell and the target cell respectively. After receiving the cell handoff command, the UE communicates with the source cell and the target cell at a same frame and at same time according to the allocated available resources.

11 Claims, 3 Drawing Sheets

TDD SYSTEM BASED CELL HANDOFF METHOD AND USER EQUIPMENT

FIELD OF THE INVENTION

The present invention relates to handoff technologies for mobile communications and especially to a TDD (Time Division Duplex) system based cell handoff method.

BACKGROUND

Currently, the mobile communication technology has been developed to the $3^{rd}$ generation. TD-SCDMA (Time Division-Synchronization Code Division Multiple Access) is one of three main 3G standards recognized by ITU (International Telecommunication Union) in May 2000 and by 3GPP (3rd Generation Partnership Project) in March 2001. As a TDM (Time Division Multiplex) 3G standard, TD-SCDMA is a TDM solution with low chip rate (1.28 MCps) in the ITU standards.

Currently, handoff is a necessary process in a cellular mobile communication system, especially for a TD-SCDMA system. As shown in FIG. 1, during the handoff process, a RNC (Radio Network Controller) 1 at the network side transmits a measurement control command to a user equipment (UE) 2 and the UE reports the received measurement result to the RNC according to a certain rule. The RNC determines whether a handoff process should be initiated according to the reported measurement result. If the handoff process is needed, the RNC firstly determines whether there are available resources in a target cell and if there are, the RNC establishes a radio link to the target cell and transmits a handoff control command from the source cell to notify the UE to switch the link to the target cell. However, according to the current baton handoff or hard handoff technology, the UE can only demodulate downlink signals in one cell during the handoff process. Since the UE can only transmit uplink signals to the source cell or the target cell in the uplink direction, the wireless network can only demodulate signals of one uplink.

During the handoff process of the UE from one cell to another, in order to reduce the ping-pong handoff for the current intra-frequency handoff method, the RNC generally sets a strict handoff threshold, for example, only when a pilot signal strength of the target cell is much higher than that of the source cell, the cell handoff process is triggered. If, there are other users existing in the intra-frequency co-time slot of the target cell before the cell handoff process, big interference may be produced at the downlink for users to be subject to the handoff process and if the handoff threshold is not properly set, the communication link between the UE and the source cell may be deteriorated before the handoff process, such that the measurement report transmitted from the UE cannot be properly received by the network or the UE cannot properly receive a handoff command from the network and thus call drop comes into being.

In addition, before the handoff process, if the pilot signal strength of the target cell is stronger than that of the source cell, i.e. in the uplink the signal power of the user to be subject to the handoff process received by the target cell is larger than that received by the source cell, the uplink signal of the user to be subject to the handoff process will produce large interference on the target cell and interference between the intra-frequency co-time slot users in the target cell will increase. Accordingly, the intra-frequency co-time slot users in the target cell will increase the transmitting power under the uplink power control in order to maintain the communication quality, which will increase the interference between the intra-frequency co-time slot users in the target cell. Similarly, the intra-frequency co-time slot users in a neighboring cell will increase the transmitting power under the uplink power control and a positive feedback is formed, which increases an average interference level of the whole network. The call drop in the uplink may happen to the user to be subject to the handoff process because of the increased interference.

SUMMARY OF THE INVENTION

An object of the present invention is to provide a cell handoff method based on a TDD system and a UE according to the method to solve the problem in the prior art that the UE cannot reliably receive a handoff control command transmitted by the RNC and thus handoff process fails. In addition, the method of the present invention is also used to reduce increased interference between users due to increased transmission power of the UE for guaranteeing communication quality for intra-frequency co-time slot users during the handoff process.

In order to achieve the above objective, the present invention provides a cell handoff method based on a TDD system, which includes steps of:

step A. a UE measures received pilot channels of a source cell and a neighboring cell according to a measurement control message and reports measurement result to a RNC;

step B. the RNC, determines whether a target cell to be subject to a cell handoff process has available resources at a time slot different from that of the source cell and if yes, transmits a cell handoff command to the UE, allocates available resources for the UE in the target cell and transmits traffic carrier data of the UE to the source cell and the target cell respectively; and step C. after receiving the cell handoff command, the UE communicates with the source cell and the target cell at a same frame and at same time according to the allocated available resources.

According to the cell handoff method based on a TDD system, between step A and step B, there is a further step D in which the RNC determines whether to perform the cell handoff process according to the reported measurement result and if yes, the method enters step B, otherwise the RNC maintains former radio link.

According to the cell handoff method based on a TDD system, in step D, the measurement result is a pilot channel power measurement result and when at least one neighboring cell has a pilot channel power measurement result equal to or larger than the preset handoff threshold, the RNC determines that the cell handoff process should be performed.

According to the cell handoff method based on a TDD system, in step D, the measurement result is a pilot channel signal/interference ratio measurement result and when at least one neighboring cell has a pilot channel signal/interference ratio measurement result equal to or larger than a preset handoff threshold, the RNC determines that the cell handoff process should be performed.

According to the cell handoff method based on a TDD system, in step B, when available resources of the target cell and the source cell are at different carrier frequencies, the RNC determines there are available resources at different time slots.

According to the cell handoff method based on a TDD system, in step B, when the RNC determines the target cell to be subject to the cell handoff process has no available resources at a time slot different from that of the source cell, it controls the UE to perform the cell handoff process by a traditional cell handoff method.

According to the cell handoff method based on a TDD system, in implementation procedure of step C, the UE transmits uplink signals to the source cell and the target cell respectively at different time slots in a same frame according to the allocated resources and receives downlink signals at different time slots from the source cell and the target cell.

According to the cell handoff method based on a TDD system, it further includes:

step E. when the UE performs a reliable communication at the uplink and downlink of the target cell, the UE reports a handoff successful message to the RNC from the target cell, and the RNC continues to determine on the reported measurement result and controls the UE to delete a communication link with the source cell.

According to the cell handoff method based on a TDD system, the UE determines whether it successfully communicates with the target cell according to a cyclic redundancy code of a demodulated data block of the downlink signal of the target cell.

According to the cell handoff method based on a TDD system, when at least one of the cyclic redundancy codes of continuous multiple data blocks is correct, it is determined that the UE successfully communicates with the target cell.

According to the cell handoff method based on a TDD system, the available resources include available code channel resources and/or time slot resources and/or frequency resources.

In order to better achieve the above objective, the present invention provides a UE, which includes:

a measurement unit, for performing a channel measurement on a neighboring cell according to a measurement control message allocated to a user by a RNC and reporting a measurement result to the RNC; and a handoff unit, for receiving a handoff command transmitted from the RNC and for communicating with a source cell and a target cell at a same time in a same frame according to available resources in the target cell allocated by the RNC during a cell handoff process.

According to the UE, the available resources include available code channel resources and/or time slot resources and/or frequency resources.

Compared with the prior art, the present invention has the following beneficially effects: according to the handoff method of the present invention, the UE can more reliably receive the handoff control command transmitted from the RNC. During the handoff process, the UE maintains communication with two cells, which can reduce the transmission power and interference. In addition, in the handoff process, the UE establishes the connection with the target cell first and then disconnect with the source cell to guarantee the reliable handoff between cells, so as to reduce the call drop ratio, to guarantee the reliable handoff of the UE, to reduce interference and to improve the system performance.

DETAILED DESCRIPTION OF THE INVENTION

Handoff technology is one of the key technologies for wireless resource control for a TD-SCDMA system as a TDD system and usage of the handoff technology directly influence system performance. With the development of the handoff technology, it not only can meet the mobility requirement of a user but also has become an important means to improve a wireless resource utilization ratio and to optimize network quality. Handoff is a process which switches a current communication link of a user to another cell in order to guarantee continuity of a mobile user communication or due to reasons of network load and maintenance and operation, etc.

Figure 1:
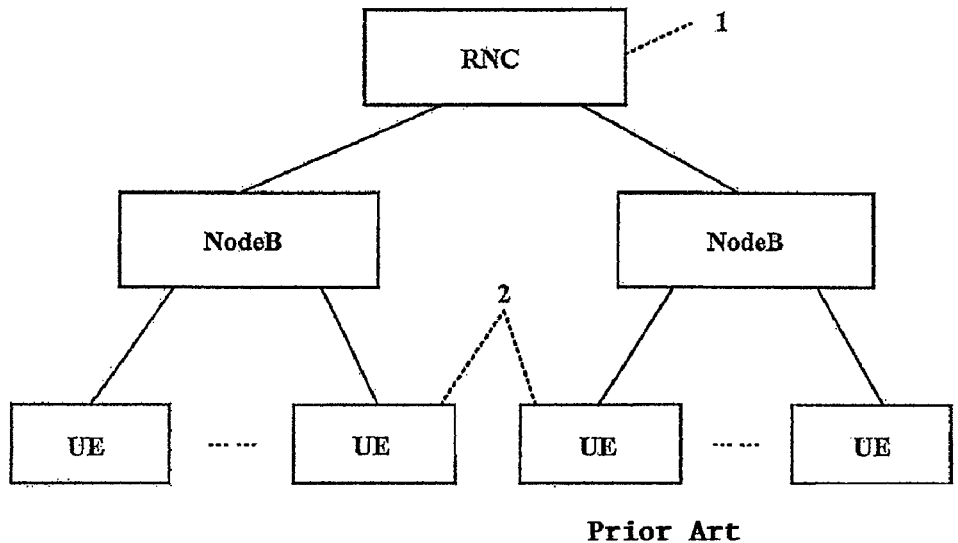
FIG. 1 is a schematic diagram showing wireless network architecture.

The present invention is particularly suitable for the TD-SCDMA system and a wireless network architecture of the system is shown in FIG. 1. During the handoff process, a RNC (Radio Network Controller) 1 in the network transmits a measurement control command to a UE (User Equipment) 2. When receiving the measurement control command, the UE measures a pilot channel power or a signal/interference ratio of a pilot channel for a source cell and a neighboring cell according to the measurement control command and then reports the received measurement result to the RNC according to a certain rule (such as periodical report or event-triggered report). The RNC determines whether a handoff process should be initiated according to the reported measurement result (the pilot channel power or the signal/interference ratio of a pilot channel) and if there is at least one neighboring cell whose pilot channel power measurement result is larger than a preset threshold, The RNC determines that the handoff process is needed. If the handoff process is needed, the RNC firstly determines whether there are available resources in a target cell at different time slots from those of the source cell and if there are, the RNC establishes a link request in the target cell, allocates resources for the UE in the target cell and transmits a handoff control command to the source cell to notify the UE to switch the link to the target cell. The RNC continues to determine on the reported measurement result and controls the UE to delete the communication link to the source cell. If the handoff process is successful, the RNC deletes the link to the source cell and releases resources, or otherwise, the RNC controls the UE to perform the cell handoff by adopting another method such as a hard handoff.

The present invention will be further discussed with reference to the accompany drawings.

Figure 2:
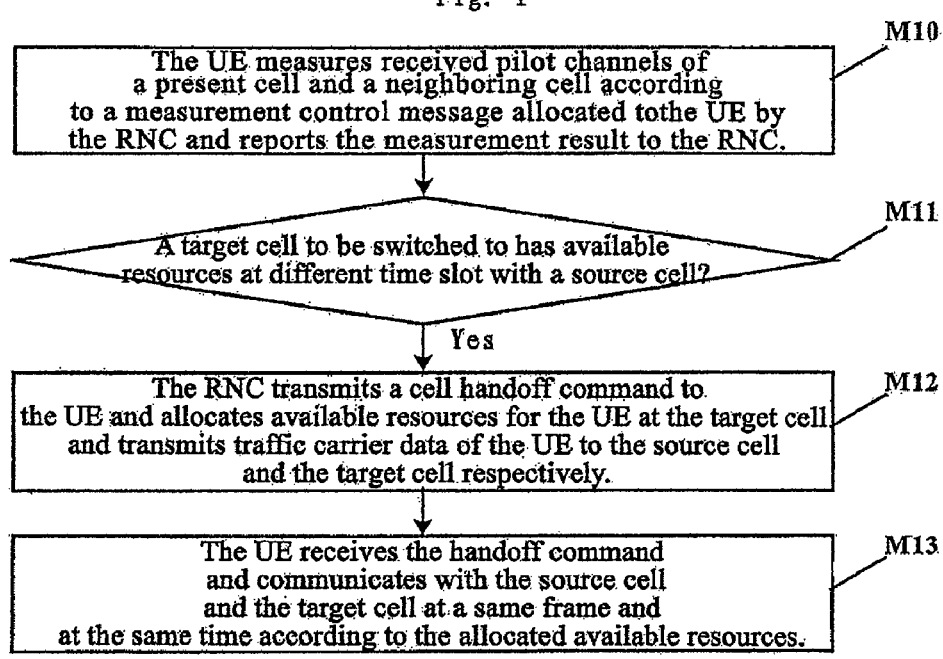
FIG. 2 is a flow chart showing a cell handoff method based on a TDD system according to an embodiment of the present invention.

FIG. 2 is a flow chart showing a cell handoff method based on a TDD system according to an embodiment of the present invention and the method includes:

Step M10: The UE measures received pilot channels of a source cell and a neighboring cell according to a measurement control message allocated to the UE by the RNC and reports the measurement result to the RNC.

Step M11: The RNC determines whether a target cell (which is a destination cell of the handoff process) for the handoff process has available resources at different time slot from that of the source cell and if the target cell has available resources, the procedure proceeds to step M12.

Step M12: The RNC transmits a cell handoff command to the UE and allocates available resources in the target cell for the UE and transmits traffic carrier data of the UE to the source cell and the target cell respectively;

Step M13: The UE receives the handoff command and communicates with the source cell and the target cell at a same frame and at the same time according to the allocated available resources.

Figure 3:
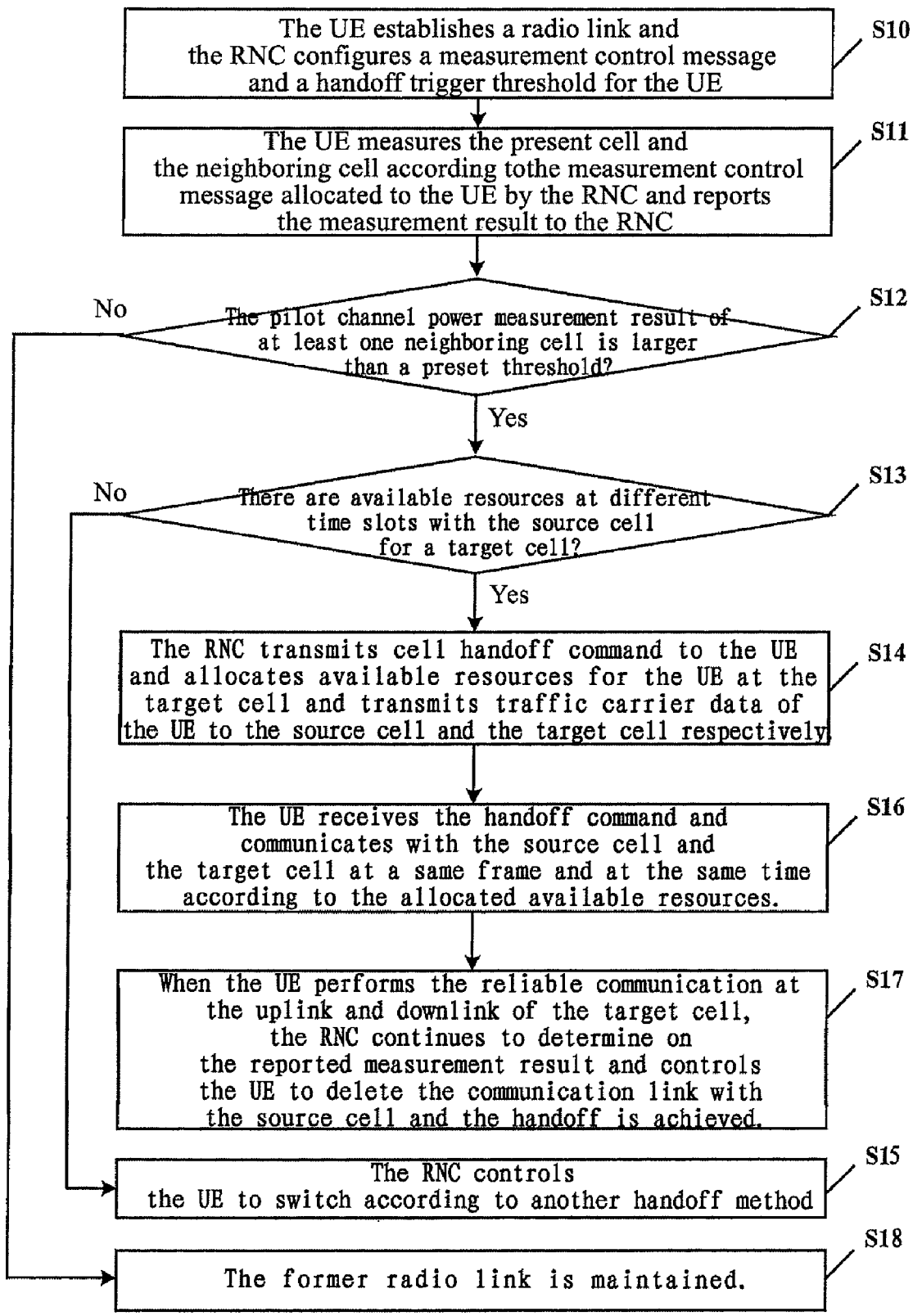
FIG. 3 shows a preferred embodiment of the cell handoff method based on a TDD system.
Figure 4:
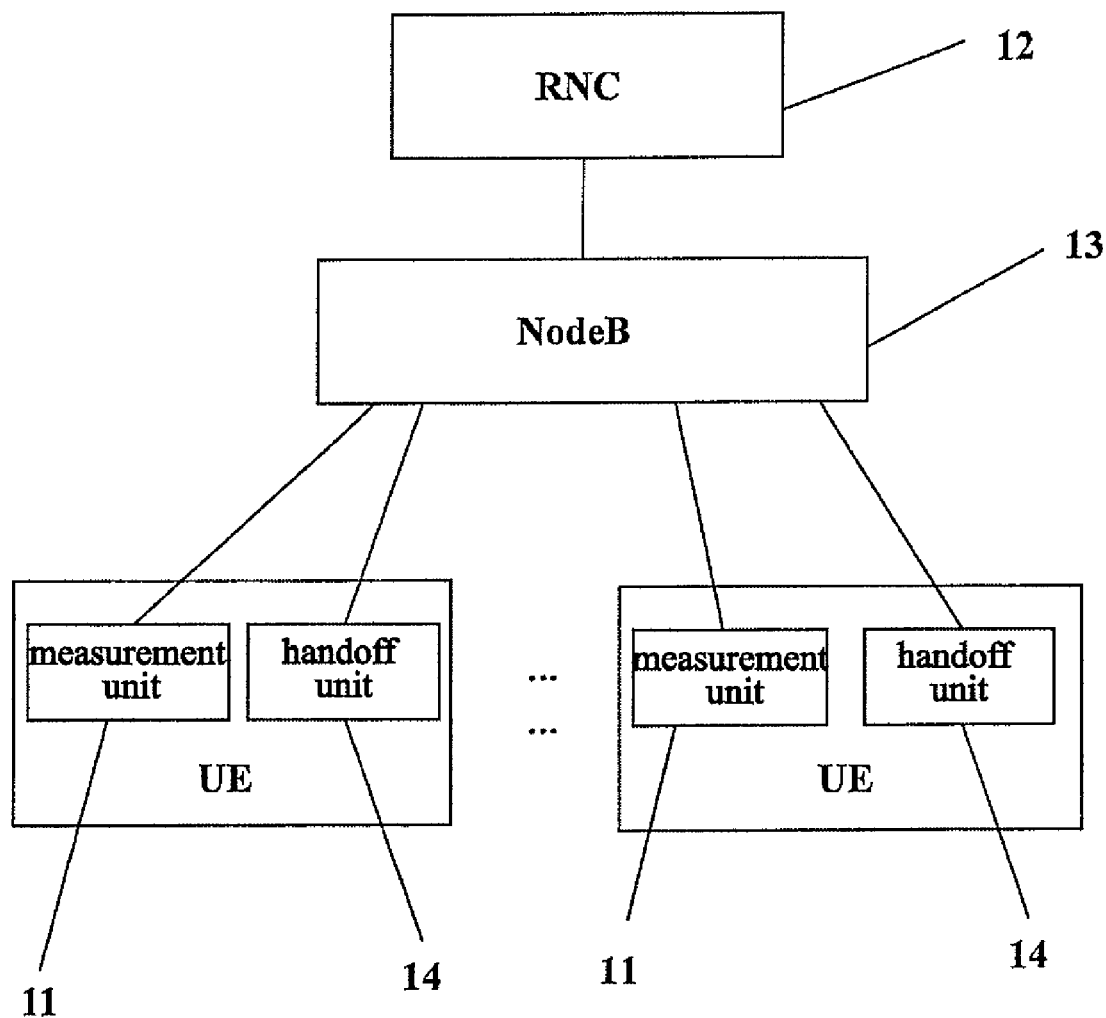
FIG. 4 is a block diagram showing a UE based on the cell handoff method according to an embodiment of the present invention.

In order to describe the present invention in more details, FIG. 3 will be referred.

As shown in FIG. 3, the method according to an embodiment of the present invention specifically includes;

Step S10: The UE establishes a radio link and the RNC configures a measurement control message and a handoff trigger threshold for the UE.

Step S11: The UE measures the source cell and the neighboring cell according to the measurement control message allocated to the UE by the RNC and reports the measurement result to the RNC.

Step S12: The RNC determines whether the pilot channel power measurement result of at least one neighboring cell is larger than a preset handoff threshold according to the reported measurement result by the UE, and if yes, the procedure proceeds to Step S13 or otherwise, the procedure proceeds to step S18;

Step S13: The RNC determines whether there are available resources at a time slot of a target cell subject to the handoff process different from that of the source cell and if there are, the procedure proceeds to Step S14 or otherwise, the procedure proceeds to Step S15. For a system in which each cell has multiple frequency points, when the RNC determines whether there are available resources at a time slot of a target cell which is target of the handoff process different from that of the source cell, if the available resources of the target cell and the source cell are at different carrier frequencies, it is determined that there are available resources at a different time slot.

Step S14: The RNC transmits a cell handoff command to the UE, allocates available resources for the UE in the target cell and transmits traffic carrier data of the UE to the source cell and the target cell respectively.

Step S15: The RNC controls the UE to perform handoff process according to the traditional handoff method.

Step S16: The UE receives the cell handoff command and communicates with the source cell and the target cell at a same frame and at the same time according to the allocated available resources.

Step S17: When the UE performs a reliable communication at the uplink and downlink of the target cell, it reports a handoff successful message from the target cell to the RNC and the RNC continues to determine on the reported measurement result and controls the UE to delete the communication link with the source cell such that the handoff is achieved.

Step S18: The former radio link is maintained.

The present invention is not only adaptable to the intra-frequency handoff, but also to the inter-frequency handoff. The inter-frequency handoff is achieved as long as the UE has an ability to realize switching of frequencies at different time slots. The present invention will be illustrated with a intra-frequency example and the process is specifically described as the following.

After the link between the UE and the wireless network is established, the RNC configures the measurement control message and the handoff trigger threshold for the UE according to the link request message. In other words, when the UE establishes the connection, the RNC configures the measurement control message of the UE through signalings. The handoff trigger threshold refers to the handoff trigger condition. An example of measurement control of the cell is given. The RNC configures a neighboring cell list for the UE according to the received link establishment request and the UE measures the received pilot channel power (P-CCPCH RSCP) or the signal/interference ratio of the neighboring cell (cells) according to the neighboring cell list and reports the measurement result to the RNC. Then, the RNC configures the handoff trigger threshold for 1G (better intra-frequency cell) or 2A (better inter-frequency cell) event for the UE. The handoff trigger threshold is generally higher by around 3 dB than the P-CCPCH RSCP of the source cell and will continue for a time period and the time period threshold is generally hundreds ms. These thresholds should be set according to practice conditions such as the network planning and actual test result. Then the configured measurement control message and the handoff trigger threshold are fed-back to the UE.

In Step S11, after the UE receives the measurement control message from the RNC, it measures the pilot channel power or the signal/interference ratio of the neighboring cell (cells) according to the measurement control message and reports the measurement result to the RNC periodically or by event trigger. For the report by the event trigger, the RNC should pre-set an event trigger condition. The event trigger condition is generally set during the network planning or according to the practices and it may be adjusted in the actual application. And then the measurement result is compared with the handoff trigger threshold. If the measurement result (a pilot channel power or signal/interference ratio of at least one neighboring cell) is equal to or larger than the preset handoff threshold, UE transmits a handoff request to the RNC.

After the RNC receives the handoff request reported from the UE, it determines whether to perform the cell handoff according to a handoff algorithm. The handoff algorithm at least meets two conditions. One is that the measurement result should meet the requirement of handoff trigger threshold and the other is that the target cell subject to the handoff process should have available resources at a time slot different from that of the source cell. In the TD-SCDMA system, the available resources include available code channel resources, time slot resources and frequency resources. The available resources also include resources of the target cell at different carrier frequency from that of the source cell. If the measurement result of the UE meets the above two conditions, the RNC allows the handoff process, allocates available resources for the UE in the target cell and notifies the UE in the source cell that it can perform the cell handoff process. At the same time, the RNC transmits service data to the source cell and the target cell and the service data refer to the traffic carrier such as the voice and data. It is required that the source cell and the target cell are subject to the handoff process with different resources at different time slots. This process is controlled by the RNC, and since the RNC knows the time slot used by the UE in the source cell, it allocates a time slot of the target cell different from that of the source cell to the UE so as to guarantee the UE can perform the handoff properly. The time slot resources are preserved by the system according to the requirement during the network planning.

If the measurement result only meets the requirement of the handoff trigger threshold and in the target cell there is no available resources at a time slot different from that of the source cell, i.e. there is no handoff condition meeting the above handoff algorithm, the RNC can control the UE to use the traditional handoff method such as the hard handoff. In addition, if the measurement result doesn't meet even the handoff trigger threshold, the former radio link is maintained, i.e. no handoff operation is performed.

When the UE receives the handoff command, it transmits uplink signals in the source cell and the target cell respectively according to the allocated resources at different time slots in a same frame and receives the downlink signals from the source cell and the target cell respectively at different time slots. For the simplicity of description, an example is given assuming that a TDMA mode is adopted in the TD-SCDMA system, there are seven traffic time slots in a frame and the traffic time slots can be used to transmit the uplink or downlink services. If the UE has adequate processing capacity, it can communicate with the source cell and the target cell with two kinds of resources. The resources of the TD-SCDMA system include code channel resources, time slot resources and frequency resources. In addition, in a CDMA system adopting FDD mode, during the soft handoff, the UE uses one kind of resource in the uplink procedure and receives downlink signals from multiple cells at the same time in the downlink procedure, so that it can be regarded that the UE uses multiple kinds of resources.

When the target cell can reliably receive the uplink signal from the UE and the UE can reliably receives the downlink signal from the target cell while the UE still maintains the uplink and downlink communication links with the source cell, i.e. during the handoff process the UE communicates with the source cell and the target cell by using the resources allocated by the RNC, when the UE can perform the reliable communication in the target cell, it transmits a message indicating the successful communication with the target cell to the RNC from the target cell and the RNC continues to determine on the reported measurement result and controls the UE to delete the communication link with the source cell. The reliable communication means that the UE determines whether the communication with the target cell is successful according to the cyclic redundancy code of the data block of the demodulated downlink signal in the target cell and if yes, the UE reports a message indicating the successful communication with the target cell to the RNC, wherein the determination condition can be that at least one of the cyclic redundancy codes of N continuous data blocks is correct which refers to a successful communication. The demodulation data of a Node B should be reported to the RNC and the RNC knows the demodulation performance of the Node B. The cyclic redundancy code is one of the most important error detecting codes. The cyclic redundancy code is actually end bits added to a transmission data block and can be a 8 bit, 16 bit or 24 bit code. The end bits are generated according to a certain algorithm and at the receiver the same algorithm is used to generate the end bits. When the two end bits are compared it can be determined whether there are errors in the data block. The main use of the cyclic redundancy code is to detect whether there are errors in the data block but it cannot correct the errors.

The above shows that according to the handoff method of the present invention, when there are other users existing at the intra-frequency co-time slot of the target cell before the cell handoff process, it will not happen that the handoff control command transmitted to the UE to be subject to the handoff process from the source cell by the RNC cannot be received due to large interference on the UE to be subject to the handoff process in the downlink, so that the reliability of handoff between cells is improved. According to the handoff method of the present invention, the UE can receive reliably the handoff control command transmitted by the RNC and the UE can maintain communications with two cells during the handoff process, so that the transmitting power of the cell can be reduced, the interference can be reduced and the performance of the system can be improved.

In addition, a UE according to the method of the present invention is provided and includes a measurement unit 11 and a handoff unit 14. The measurement unit 11 performs a channel measurement for neighboring cells (intra-frequency cells or inter-frequency cells) according to the measurement control message configured to the UE by the RNC 12 and reports the measurement result to the Node B 13 and then the Node B 13 notifies the RNC 12. The RNC 12 determines whether there are available resources at a time slot of the target cell different from that of the source cell and if yes, allocates available resources for the UE in the target cell and then transmits a handoff command to the handoff unit 14. After the handoff unit 14 receives the handoff command transmitted from the RNC 12, it communicates with the source cell and the target cell in the same frame according to the allocated available resources. The available resources include available code channel resources and/or time slot resources and/or frequency resources. The implementation process is the same with that discussed above and will not be illustrated in detail here.

In order to better illustrate the present invention, an application example is given.

A 12.2 kbps voice service is taken as an example, where the uplink and downlink time slots are symmetry. The UE uses one SF=8 code channel in the TS1 to transmit the uplink signals and the Node B uses two SF=16 code channels in the TS4 to transmit downlink signals. When the UE moves from one cell (the source cell) to another cell (target cell) and a link between the UE and the wireless network is established, the RNC configures a measurement control message and handoff trigger threshold for the UE according to a link request message and feeds back the configuration result to the UE. The UE measures a pilot power or service quality of the neighboring cell (cells) according to the measurement control message from the RNC and compares the measurement result with the handoff trigger threshold. If the measurement result is larger than or equal to the handoff trigger threshold, the UE transmits a handoff request to the RNC and the RNC determines whether the handoff process of the UE should be performed according to the pilot channel power (P-CCPCH RSCP) measured by the UE. If the handoff process is needed, it determines whether there are available resources at a time slot of the target cell different from that of the source cell and if there are no, a traditional handoff method (such as hard handoff) is adopted; if there are, i.e. TS2/5 or TS3/6 has idle code channels, the UE is allowed to perform the handoff process according to the method of the present invention. The RNC allocates the resources for the UE in the target cell, such as one SF=8 uplink code channel in TS2 and two SF=16 downlink channels in TS5. The RNC notifies the UE the resources of the target cell through the channel associated signaling in the TS4 of the source cell and notifies the UE that the handoff process can be performed; at the same time the RNC transmits downlink voice data of the UE to the source cell and the target cell. After the UE receives the handoff command, it transmits the uplink voice signal to the source cell and the target cell in TS1 and TS2 respectively and receives the downlink voice signal from the source cell and the target cell in TS4 and TS5 in the same frame respectively. When the UE can correctly demodulate the downlink signal from the target cell and notifies the RNC while the target cell can correctly demodulate the uplink signal from the UE and notifies the RNC, the RNC determines the UE is successfully subject to the handoff process. The RNC deletes the link with the source cell and notifies the UE.

According to the handoff method of the present invention, the UE can perform the handoff process before the communication quality deteriorates. In the current wireless network, both the UE and the Node B need to measure the BLER (block error ratio) of service channels at real time. When setting the handoff threshold (condition), it tries an attempt to trigger the handoff process before the deterioration of the channel quality of the UE according to the network planning so that the handoff successful ratio can be guaranteed. The specific parameter setting may also be adjusted according to the practical conditions. The handoff process is achieved when the target cell can reliably receive data. In other words, in the above handoff process, the UE firstly establishes a connection with the target cell and then disconnect with the source cell so as to guarantee a reliable handoff process and to reduce a call drop ratio.

The above are only preferred embodiments of the present invention. It should be understood to those skilled in the art that without departing from the principle of the present invention, various improvements and amendments can be made which are also in the protection scope of the present invention.

The invention claimed is:

1. A cell handoff method based on a TDD system, comprising:
   step A. measuring, by a UE, received pilot channels of a source cell and a neighboring cell according to a measurement control message and reporting measurement result to a RNC;
   step B. determining, by the RNC, whether to perform the cell handoff process according to the reported measurement result and if yes, entering step C, otherwise maintaining former radio link;
   Step C. when the RNC determines according to the reported measurement result that a cell handoff process is to be performed, determining, by the RNC, whether a target cell to be subject to a cell handoff process has available resources at a time slot different from that of the source cell and if yes, transmitting a cell handoff command to the UE, allocating available resources for the UE in the target cell and transmitting traffic carrier data of the UE to the source cell and the target cell respectively;
   Step D. after receiving the cell handoff command, communicating, by the UE, with the source cell and the target cell at a same frame and at same time according to the allocated available resources; and
   step E. when the UE performs a reliable communication at the uplink and downlink of the target cell, reporting, by the UE, a handoff successful message to the RNC from the target cell, and continuing, by the RNC, to determine on the reported measurement result and controlling the UE to delete a communication link with the source cell.

2. The method according to claim 1, wherein in step B, the measurement result is a pilot channel power measurement result and when at least one neighboring cell has a pilot channel power measurement result equal to or larger than the preset handoff threshold, the RNC determines that the cell handoff process should be performed.

3. The method according to claim 1, wherein in step B, the measurement result is a pilot channel signal/interference ratio measurement result and when at least one neighboring cell has a pilot channel signal/interference ratio measurement result equal to or larger than a preset handoff threshold, the RNC determines that the cell handoff process should be performed.

4. The method according to claim 1, wherein in step C, when available resources of the target cell and the source cell are at different carrier frequencies, the RNC determines there are available resources at different time slots.

5. The method according to claim 1, wherein in step C, when the RNC determines the target cell to be subject to the cell handoff process has no available resources at a time slot different from that of the source cell, it controls the UE to perform the cell handoff process by a traditional cell handoff method.

6. The method according to claim 1, wherein
   in implementation procedure of step D, the UE transmits uplink signals to the source cell and the target cell respectively at different time slots in a same frame according to the allocated resources and receives downlink signals at different time slots from the source cell and the target cell.

7. The method according to claim 1, wherein the UE determines whether it successfully communicates with the target cell according to a cyclic redundancy code of a demodulated data block of the downlink signal of the target cell.

8. The method according to claim 7, wherein when at least one of the cyclic redundancy codes of continuous multiple data blocks is correct, it is determined that the UE successfully communicates with the target cell.

9. The method according to claim 1, wherein the available resources comprise available code channel resources and/or time slot resources and/or frequency resources.

10. A system, comprising:
    a user equipment (UE), for measuring, received pilot channels of a source cell and a neighboring cell according to a measurement control message and reporting measurement result to a RNC; after receiving the cell handoff command, communicating with the source cell and the target cell at a same frame and at same time according to the allocated available resources; when performing a reliable communication at the uplink and downlink of the target cell, reporting a handoff successful message to the RNC from the target cell; and
    an RNC, for determining whether to perform the cell handoff process according to the reported measurement result; determining whether a target cell to be subject to a cell handoff process has available resources at a time slot different from that of the source cell and if yes, transmitting a cell handoff command to the UE, allocating available resources for the UE in the target cell and transmitting traffic carrier data of the UE to the source cell and the target cell respectively; determining on the reported measurement result and controlling the UE to delete a communication link with the source cell,
    wherein the RNC maintains former radio link while determining not to perform the cell handoff process according to the reported measurement result.

11. The system according to claim 10, wherein the available resources comprise available code channel resources and/or time slot resources and/or frequency resources.

* * * * *